(12) United States Patent
Mekic et al.

(10) Patent No.: US 12,326,535 B2
(45) Date of Patent: Jun. 10, 2025

(54) DETERMINATION OF NEUTRON POROSITY AND BULK DENSITY FROM A PULSED NEUTRON TOOL

(71) Applicant: Weatherford Technology Holdings, LLC, Houston, TX (US)

(72) Inventors: Natasa Mekic, Spring, TX (US); Richard Pemper, Sugar Land, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 189 days.

(21) Appl. No.: 18/299,184

(22) Filed: Apr. 12, 2023

(65) Prior Publication Data

US 2024/0345281 A1 Oct. 17, 2024

(51) Int. Cl.
*G01V 5/10* (2006.01)

(52) U.S. Cl.
CPC .................................. *G01V 5/102* (2013.01)

(58) Field of Classification Search
CPC ........ G01V 5/102; G01V 5/101; G01V 5/045; G01V 5/104
See application file for complete search history.

(56) References Cited

U.S. PATENT DOCUMENTS

| | | | |
|---|---|---|---|
| 3,509,346 | A | 4/1970 | Mills, Jr. et al. |
| 7,361,886 | B2 | 4/2008 | Stoller et al. |
| 8,692,185 | B2 * | 4/2014 | Guo ...................... G01V 5/104 250/269.4 |
| 8,847,149 | B2 | 9/2014 | Jacobson et al. |
| 10,001,582 | B2 | 6/2018 | Zhou |
| 10,466,384 | B2 | 11/2019 | McKeon et al. |
| 10,488,548 | B2 | 11/2019 | Zhou |
| 11,243,328 | B2 | 2/2022 | Pemper et al. |
| 11,635,543 | B2 * | 4/2023 | Mamtimin ............... E21B 49/00 702/8 |
| 2005/0067160 | A1 | 3/2005 | Jacobson |
| 2010/0193676 | A1 | 8/2010 | Jacobson et al. |
| 2010/0314535 | A1 | 12/2010 | Zhang et al. |
| 2012/0042311 | A1 | 2/2012 | Biran et al. |

(Continued)

FOREIGN PATENT DOCUMENTS

WO 2012/177732 12/2012

OTHER PUBLICATIONS

Reichel, Nicole, et al., "Neutron-Gamma Density (NGD): Principles, Field Test Results and Log Quality Control of a Radioisotope-Free Bulk Density Measurement," SPWLA 53rd Annual Logging Symposium, Jun. 16-20, 2012, 15 pages.

(Continued)

*Primary Examiner* — David P Porta
*Assistant Examiner* — Fani Polyzos Boosalis
(74) *Attorney, Agent, or Firm* — Lewis & Reese, PLLC (57) ABSTRACT

Methods and systems for determining bulk density and/or neutron porosity of a formation are described herein. The methods and systems use a pulsed neutron (PN) tool and may be performed with a tool having a single gamma detector though tools with multiple detectors may be used as well. The PN tool may be a geochemical logging tool. The methods and systems involve partitioning the time spectrum into pluralities of bins that are indicative of non-clay mineral elements and of shale/clay to the overall bulk density.

19 Claims, 6 Drawing Sheets

(56) References Cited

U.S. PATENT DOCUMENTS

2012/0197529 A1    8/2012   Stephenson et al.
2013/0048849 A1    2/2013   Li et al.
2014/0001350 A1    1/2014   Beekman et al.
2016/0320523 A1   11/2016   Inanc et al.

OTHER PUBLICATIONS

International Search Report and Written Opinion regarding corresponding PCT Application No. PCT/US2024/019352, mailed Jun. 7, 2024.

* cited by examiner

Figure 6

DETERMINATION OF NEUTRON POROSITY AND BULK DENSITY FROM A PULSED NEUTRON TOOL

FIELD OF THE INVENTION

This application relates to methods and systems for wellbore logging, and more particularly to using at least a single detector of a pulsed neutron logging (PNL) tool to determine porosity and bulk density of a formation.

INTRODUCTION

Historically the neutron porosity and/or bulk density (or density porosity) of a formation has been derived from data collected using neutron-neutron and/or gamma-gamma tools logged in open hole wellbores. In a neutron-neutron tool a neutron source is used to produce neutrons and neutron detectors are used to detect neutrons after they have interacted with the formation and borehole. In a gamma-gamma tool a gamma source is used to produce gamma rays and the gamma rays are detected after borehole and formation interactions. These types of tools typically have at least two detectors spaced at different axial distances from the source and the mentioned formation properties are derived based on the ratio of either neutrons or gamma photons, respectively, detected at each of the detectors. A disadvantage of neutron-neutron and gamma-gamma tools is that they are difficult to use in cased hole applications because they generally have a shallow depth of investigation.

Neutron-gamma tools with pulsed neutron generators, also known as Pulsed Neutron Logging (PNL) tools, may be used to obtain information about hydrocarbon saturation when logging is performed through cased wellbores. In such tools, neutrons are produced by the source and gamma photons are collected at the detectors. Besides providing information of reservoir hydrocarbon saturation, PNL tools can also be used to elucidate formation properties, such as neutron porosity. PNL tools or neutron-gamma tools have deeper depth of investigation when compared to neutron-neutron and gamma-gamma tools and also depending on neutron pulsing sequence design, they can produce larger amount of neutrons resulting in larger amount of gamma photons count at the detector(s), which gives them the advantage for deriving neutron porosity and formation bulk density.

Most of today's solutions for deriving neutron porosity from PNL tools is based on determining a ratio of gamma photons detected at the two or more detectors. When fast neutrons are slowed down by collisions with hydrogen, their energies are reduced to epithermal or thermal state, making them available to be captured by surrounding atoms where such an action results in production of gamma photons. The ratio of the gamma flux at the two detectors is a function of both neutron and gamma interactions, transport of both particles, and the distance the particles travel. This is assumed to be proportional to Hydrogen Index (HI) of the formation and can provide a measure of formation porosity.

As explained below, techniques requiring only a single detector can provide advantages over the multi-detector techniques described in the art. Accordingly, there is a need in the art for methods and systems for measuring neutron porosity and bulk density using a single detector of a PNL tool.

SUMMARY

Disclosed herein is a method of determining a bulk density of a formation traversed by a borehole using a pulsed neutron (PN) tool deployable in the wellbore, wherein the formation comprises matrix materials and shale materials, and wherein the PN tool comprises a source configured to issue bursts of fast neutrons, thereby irradiating the formation with neutrons, and at least one detector configured to detect gamma photons resulting from the irradiating and arriving at the detector, the method comprising: (i) receiving data from a single detector of the at least one detectors, wherein the data is indicative of gamma photon counts detected at the single detector, (ii) binning the gamma photon counts into a first plurality of bins comprising gamma photon counts detected during bursts of fast neutrons and a second plurality of bins comprising gamma photon counts detected after bursts of fast neutrons, and (iii) using the first and second pluralities of bins to calculate the bulk density of the formation. According to some embodiments, the first plurality of bins comprises gamma photon counts arising inelastic and capture interactions in the formation. According to some embodiments, the second plurality of bins comprises gamma photon counts arising from capture interactions in the formation. According to some embodiments, the data comprises: a burst duration comprising photon counts detected during the bursts, a capture duration comprising capture photon counts arising after the bursts, a sigma decay duration comprising photon counts arising from sigma decay, and a background duration comprising photon counts arising from background radiation. According to some embodiments, the first plurality of bins comprises gamma counts detected during the burst duration. According to some embodiments, the capture duration comprises a first sub-duration and a second sub-duration later than the first sub-duration, and wherein the second plurality of bins comprises gamma photon counts from the second sub-duration. According to some embodiments, using the first and second pluralities of bins to calculate the bulk density of the formation comprises: determining a first fractional contribution (BB_Frac) using the formula:

$$BB\_Frac = PCB/(PCB + PCC)$$

where PCB is the gamma photon counts detected during the burst duration and PCC is the gamma photon counts detected during the capture duration, and determining a second fractional contribution (LCB_Frac) using the formula:

$$LCB\_Frac = PCC/(PCB + PCC).$$

According to some embodiments, calculating the bulk density using the formula:

$$RHOB = DM \times \ln(BB\_Frac) - DS \times \ln(LCB\_Frac)$$

where RHOB is the bulk density, DM is the density of the matrix materials and DS is the density of the shale materials. According to some embodiments, the matrix materials and the shale materials, and their respective densities, are determined based on historical measurements of the formation. According to some embodiments, the matrix materials and the shale materials are spectrographically determined using the PN tool. According to some embodiments, the method further comprises repeating steps (i)-(iii) as a function of depth to determine a density log of the formation.

Also disclosed herein is a system of determining a bulk density of a formation traversed by a borehole using a pulsed neutron (PN) tool deployable in the wellbore, wherein the formation comprises matrix materials and shale materials, and wherein the PN tool comprises a source configured to issue bursts of fast neutrons, thereby irradiating the formation with neutrons, and at least one detector configured to detect gamma photons resulting from the irradiating and arriving at the detector, the system comprising: a non-transitory computer readable storage medium comprising instructions, which when executed by a computer configure the computer to perform a method comprising: (i) receiving data from a single detector of the at least one detectors, wherein the data is indicative of gamma photon counts detected at the single detector, (ii) binning the gamma photon counts into a first plurality of bins comprising gamma photon counts detected during bursts of fast neutrons and a second plurality of bins comprising gamma photon counts detected after bursts of fast neutrons, and (iii) using the first and second pluralities of bins to calculate the bulk density of the formation. According to some embodiments, the first plurality of bins comprises gamma photon counts arising inelastic and capture interactions in the formation and the second plurality of bins comprises gamma photon counts arising from capture interactions in the formation. According to some embodiments, the data comprises: a burst duration comprising photon counts detected during the bursts, a capture duration comprising capture photon counts arising after the bursts, a sigma decay duration comprising photon counts arising from sigma decay, and a background duration comprising photon counts arising from background radiation. According to some embodiments, the first plurality of bins comprises gamma counts detected during the burst duration. According to some embodiments, the capture duration comprises a first sub-duration and a second sub-duration later than the first sub-duration, and wherein the second plurality of bins comprises gamma photon counts from the second sub-duration. According to some embodiments, using the first and second pluralities of bins to calculate the bulk density of the formation comprises: determining a first fractional contribution (BB_Frac) using the formula:

$$BB\_Frac = PCB/(PCB + PCC)$$

where PCB is the gamma photon counts detected during the burst duration and PCC is the gamma photon counts detected during the capture duration, and determining a second fractional contribution (LCB_Frac) using the formula:

$$LCB\_Frac = PCC/(PCB + PCC).$$

According to some embodiments, calculating the bulk density comprises using the formula:

$$RHOB = DM \times \ln(BB\_Frac) - DS \times \ln(LCB\_Frac)$$

where RHOB is the bulk density, DM is the density of the matrix materials and DS is the density of the shale materials. According to some embodiments, the matrix materials and the shale materials, and their respective densities, are determined based on historical measurements of the formation. According to some embodiments, the matrix materials and the shale materials are spectrographically determined using the PN tool. Also disclosed herein are non-transitory computer-readable media comprising instructions, which when executed on a computer, configure the computer to perform any of the above-described methods.

DETAILED DESCRIPTION

This disclosure relates to methods and systems for determining bulk density using a single gamma ray detector of a pulsed neutron (PN) tool. The methods and systems overcome the disadvantages of using neutron-neutron and/or gamma-gamma tools, as described above. Namely, the greater depth of investigation provided by the disclosed PN methods and systems better suit them for deployment in cased hole applications. The methods and systems described herein are also advantageous for open hole applications, especially for zones with invaded fluids, enlarged boreholes due to rock instability, and the like. Moreover, the single detector methods and systems have advantages over multi-detector PN techniques. Using a single detector provides better depth resolution, since the volume of interrogation is less. In other words, since the single detector is typically closer to the pulsed neutron generator than is the furthest detector in a multi-detector system, the data generated by each measurement correlates to a more focused distance along the borehole. The disclosed methods may be implemented using multi-detector tools, whereby the additional detector(s) may be used as a comparison for the data obtained at the primary (typically the closest) detector. But the additional detector(s) are not required to compensate for the first detector as in the prior art PN density measurements.

The bulk density (referred to herein as "RHOB" or $\rho_b$) is the sum of the density of the clay (i.e., shale) density plus the density of non-clay minerals, accounting for the porosity in each of those fractions. Thus, the bulk density may be calculated as: RHOB=clay density (including the pores in the clay)+non-clay mineral density (including the pores in the non-clay mineral).

Figure 1:
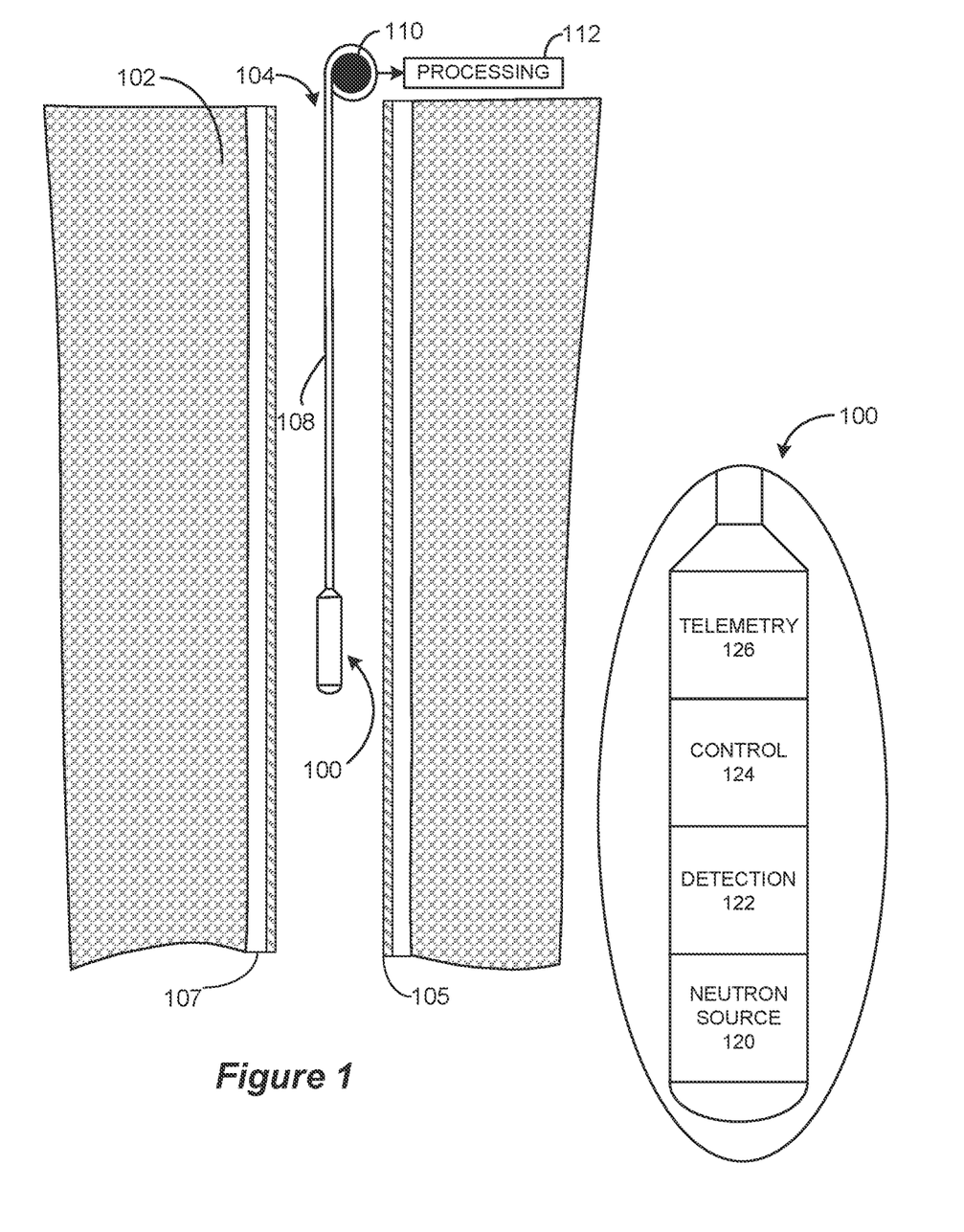
FIG. 1 shows a logging tool conveyed in a wellbore.

FIG. 1 illustrates an embodiment of a PN tool 100 that can be used to determine the neutron porosity and bulk density of a formation using the techniques described herein. The tool 100 may more specifically be referred to as a geochemical logging tool. Geochemical logging tools use the physical principles of nuclear spectroscopy to ascertain the chemical content of subsurface formations. The formation chemistry, in turn, can be utilized to determine matrix mineralogy. Examples of how geochemical logging tools may be used to determine formation chemistry and matrix minerology are described in the prior art, for example, in U.S. Pat. Nos. 10,466,384 and 11,243,328 ("the '328 patent"), the entire contents of which are incorporated herein by reference in their entirety. Other techniques known in the art for determining matrix minerology may also be used within the context of the disclosed techniques. As will be explained in more detail below, embodiments of the disclosed methods may use the detailed matrix minerology information provided by the geochemical logging tool to provide depth-variable matrix and clay densities, which in turn, may be used to determine the bulk density. However, other embodiments of the disclosed methods may be used to determine bulk density even when spectroscopically determined matrix minerology is not available.

In the illustrated embodiment, the tool 100 is conveyed within the wellbore 104. The illustrated wellbore 104 is a cased wellbore having a casing 105 and cement 107. But other applications may involve deploying the tool in an open hole wellbore, as mentioned above. The tool 100 may be conveyed within the wellbore 104 by a wireline logging cable 108 that is connected to draw works 110 and a processing system 112 at the surface. The wireline logging cable 108 supports the weight of the tool 100 and acts as a data conduit between the processing system 112 and the tool 100. While the tool 100 is illustrated as being conveyed via wireline 108, it will be understood that the tool 100 could also be conveyed into the wellbore 104 in other ways such as via coiled tubing, drill string (e.g., during a logging while drilling operation), etc. According to some embodiments, the pulsed-neutron geochemical logging tool 100 may be run as part of a logging string that includes the spectral gamma ray, density, and neutron porosity tools.

The tool 100 includes a neutron source section 120, a detection section 122, a control section 124, and a telemetry section 126. The neutron source section 120 includes a neutron source 130 (FIG. 2) that bombards the formation adjacent the tool 100 with high energy neutrons (e.g., 14 MeV). The neutron source 120 is preferably a pulsed neutron generator, which enables the precisely timed emission of neutrons. The detection section 122 includes one or more detectors that detect gamma radiation that is emitted because of interactions between emitted neutrons and the nuclei of formation elements. According to some embodiments, the detector(s) may be lanthanum bromide ($LaBr_3$) gamma ray detectors (i.e., one or more photomultiplier tubes (PMTs) equipped with $LaBr_3$ scintillation materials). Lanthanum bromide doped with cesium $LaBr_3$ (Ce) can provide excellent performance for a nuclear spectroscopy system due to its outstanding properties, which include its elevated density (5.08 g/cm3 density), high resolution, and its ultra-fast decay time (16 nanoseconds). It also provides over 90% of its normal light yield at temperatures up to 350° F. (177° C.). According to some embodiments, the length of the tool can be on the order about 10 to about 15 feet, for example, and its diameter can be about 1 to about 5 inches. Other tool geometries may be used, as will be appreciated by those of skill in the art. According to some embodiments, the distance between the neutron source 120 and the detection section 122, as well as a significant amount of internal shielding, may be optimized based upon modeling, such as Monte Carlo modeling. According to some embodiments, a boron coating may be applied to the housing near the generator-detector system. Consequently, gamma rays from the housing material from slow, or thermal, neutrons can be eliminated, resulting in a significantly improved capture energy spectrum.

Control section 124 includes control circuitry that controls the operation of the neutron source section 120, detection section 122, and telemetry section 126. The telemetry section 126 includes modulation and demodulation circuitry for sending and receiving electrical signals to and from a remote device such as the processing system 112 (e.g., via wireline 108).

It should be noted that embodiments of the disclosed methods are implemented using one or more information processors, which may be any information processor known in the art, such as one or more microprocessors. Examples of processors may be configured within the tool and/or within the processing system 112. Examples of microprocessors include dual-core and quad-core processors and the like. Certain embodiments of the present disclosure may be implemented with a hardware environment that includes an information processor, an information storage medium, an input device, processor memory, and may include peripheral information storage medium. The hardware environment may be downhole, at the surface, and/or at a remote location. Moreover, the several components of the hardware environment may be distributed among those locations. The input device may be any information reader or user input device, such as data card reader, keyboard, USB port, etc. The information storage medium stores information provided by the detectors. The information storage medium may be any standard computer information storage device, such as a ROM, USB drive, memory stick, hard disk, removable RAM, EPROMS, EAROMs, EEPROM, flash memories, and optical disks or other commonly used memory storage system known to one of ordinary skill in the art including Internet-based storage. Embodiments of the information storage medium, referred to herein as a non-transitory computer readable medium, may store a computer program comprising instructions that when executed causes the information processor to execute the disclosed methods. Examples of non-transitory computer readable mediums be any standard computer information storage device, such as a USB drive, memory stick, hard disk, removable RAM, or other commonly used memory storage system known to one of ordinary skill in the art including Internet-based storage. Information processor may be any form of computer or mathematical processing hardware, including Internet-based hardware. When the program is loaded from information storage medium into processor memory (e.g. computer RAM), the program, when executed, causes information processor to retrieve detector information from either information storage medium or peripheral information storage medium and execute the disclosed methods. Information processor may be located on the surface, downhole, and/or at a remote location.

Figure 2:
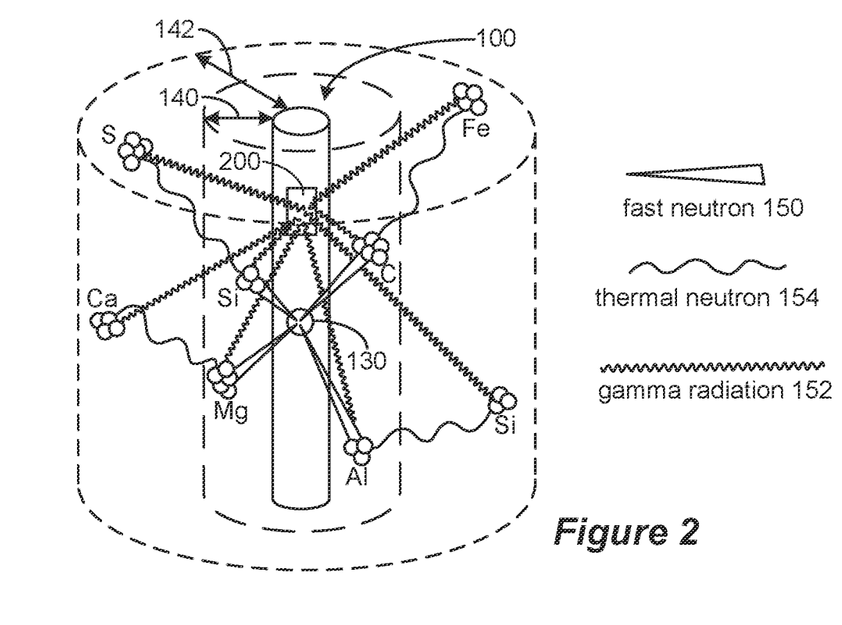
FIG. 2 shows various interactions of pulsed neutrons with elements in the environment of the wellbore.

FIG. 2 provides a simplified view of the interactions between neutrons emitted by the tool 100 and the nuclei of neighboring atoms in the formation. Nearer to the neutron source 130 (e.g., within the radius 140), fast-moving neutrons 150 are scattered through inelastic and elastic collisions with the nuclei of atoms in the borehole and in the formation. When inelastic scattering occurs, a portion of the neutron's kinetic energy is transferred to the nucleus of the atom with which it collides, decreasing the energy of the neutron. Often, at least a portion of the energy transferred from the incident neutron to the atom's nucleus briefly activates the nucleus to an unstable, excited state. When the nucleus transitions back to a stable, ground state, it may emit gamma radiation 152 with energy that is characteristic of the atom. As the neutrons move away from the neutron source 130 and continue to lose energy, they reach thermal equilibrium with the surrounding medium. These "thermal neutrons" 154 will eventually be absorbed, i.e., "captured" by the nuclei of neighboring atoms, resulting in new isotopes of the atoms. The capture of a thermal neutron often results in the emission of gamma radiation 152 with energy that is again characteristic of the atom that captured the neutron. The different elements that interact with neutrons in the ways shown in FIG. 2 are described as "detection elements" because the gamma radiation that they produce is detectable and can be attributed to the type of element that resulted in the gamma radiation as described below.

Gamma radiation refers generally to high-energy electromagnetic radiation having an energy level that exceeds 60,000 electron Volts (60 keV). Gamma radiation 152 that is emitted because of the above-described neutron interactions (as well as naturally occurring gamma radiation) generally has an energy between 60 keV and 10 MeV and is detected by one or more gamma radiation detectors in the tool's 100 detection section 122. Each detector may be placed near the periphery of the tool 100 to minimize the distance between the detector and the gamma radiation source, i.e., the formation 102 traversed by the wellbore 104.

Figure 3A:
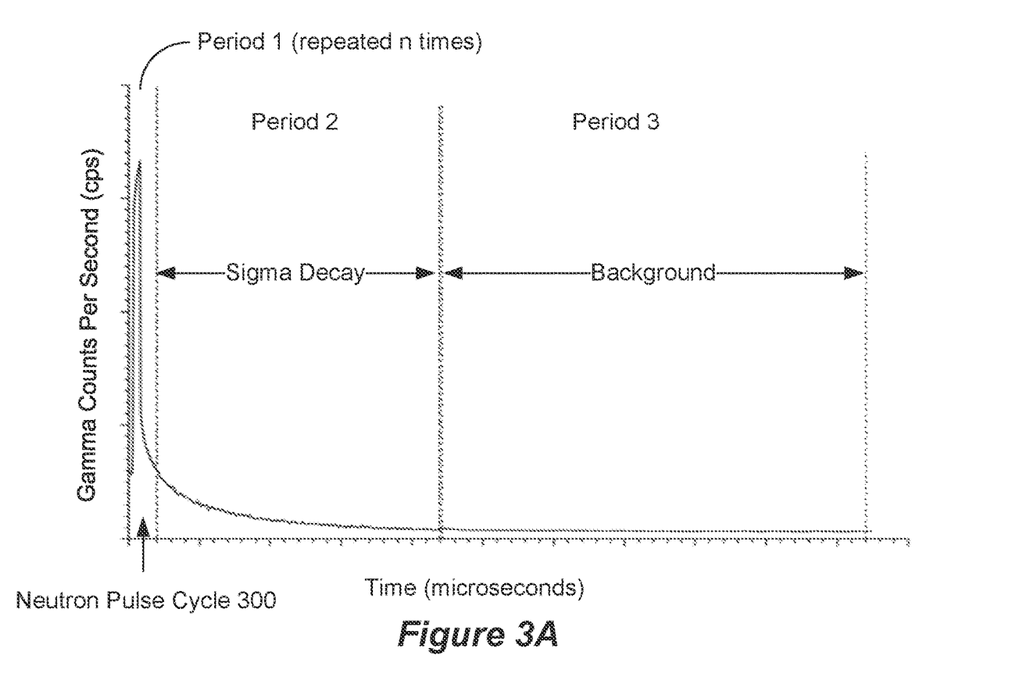
FIGS. 3A and 3B show aspects of obtaining a pulsed neutron spectrum.
Figure 3B:
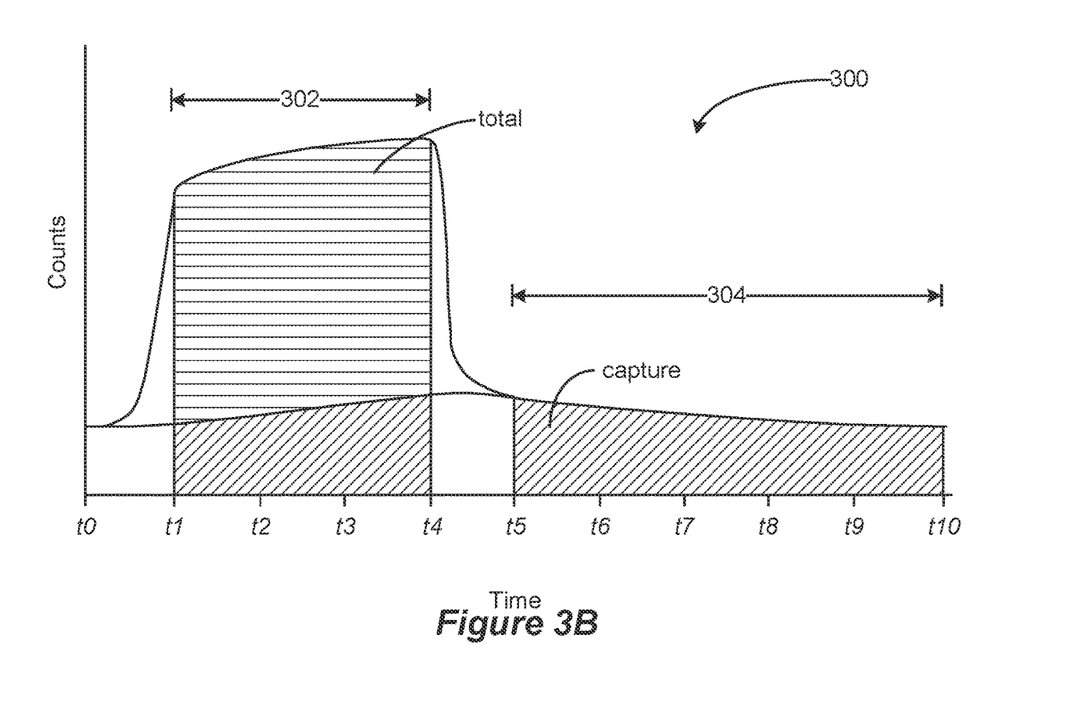

FIG. 3A illustrates the timing of the pulsed neutron tool 100. In the illustrated sequence, a neutron pulse cycle 300 is repeated, for example, for a few hundred times (i.e., n times, where n is typically on the order of a few hundred). The pulsing (burst) occurs within a time period denoted Period 1 in the drawing. Period 1 also includes a time during which gamma counts are decaying. The gamma counts are due mostly to inelastic scattering and neutron capture events. FIG. 3B illustrates a single neutron pulse cycle 302 and shows an example of the total number of detected gamma radiation photons (of various different energy levels) that are observed during the course of a single neutron pulse cycle as well as the number of those total photons that are emitted as a result of a neutron capture interaction. According to some embodiments, the neutron source 130 can be pulsed at around 5 kHz, so each detection cycle lasts 200 microseconds. When the neutron source 130 pulse begins at t0, the tool's one or more detectors continue to observe gamma radiation photons that are emitted as a result of neutron capture interactions associated with neutrons that were emitted during the previous neutron pulse(s).

Between t0 and t1, gamma radiation detected by the detectors sharply increases, primarily as a result of inelastic collisions between the emitted neutrons and the nuclei of formation and borehole atoms. The one or more detectors are synchronized with the source 130, and between times t1 and t4 (interval 302), the pulses are digitized by an Analog-to-Digital Converter (ADC) and the digitized pulses, or at least their magnitudes, are stored in a memory. The digitized magnitudes enable each gamma radiation photon observed by the detector to be sorted into an energy channel based on the received photon's energy. According to some embodiments, the full 0-9 MeV detection energy range is divided into 256 channels each having an energy range of approximately 35 keV although other numbers of channels (e.g., 512, 1024, or more) with different energy resolutions may also be used. The energy spectra obtained in this way can be used to determine the formation chemistry and matrix minerology as described in the incorporated references cited above, or by other techniques known in the art.

Between t4 and t5, gamma radiation sharply declines as inelastic collisions decrease to near zero (i.e., as emitted neutrons lose the energy required for inelastic interactions or move to a distance from the detectors at which such interactions are not easily detectable), and, during this time period, no pulses are stored in the memory. Between t5 and t10 (interval 304), the observed gamma radiation is caused almost exclusively by neutron capture interactions, and the magnitudes of digitized pulses are again stored in the memory. The digitized magnitudes for the pulses detected within the intervals 302 and 304 are provided from memory to a controller (e.g., a microprocessor, a microcontroller, a FPGA, or other logic circuitry). From the data corresponding to the intervals 302 and 304, the controller generates a raw total, or burst, spectrum and a raw capture spectrum, respectively.

Essentially, the raw total spectrum comprises a histogram in which each pulse recorded within the interval 302 increments a count of a particular channel based on its magnitude. Similarly, the raw capture spectrum is essentially a histogram based on the pulses within the interval 304. Each spectrum specifies a quantity of the detected gamma radiation that is within each of a plurality of energy ranges. Although not illustrated, some portion of the gamma radiation detected by the tool 100 may result from background (i.e., naturally occurring) radiation and/or interactions of emitted neutrons with atoms in a borehole fluid or wellbore conduit (e.g., casing). The raw total and capture and inelastic spectra are processed to remove these effects, which are recorded during the Background interval, illustrated in FIG. 3A.

Referring again to FIG. 3A, the neutron pulse cycle 300 may be followed by a sigma time decay gate (e.g., 0.002 seconds, Period 2) and a background gate (e.g., 0.003 seconds, Period 3). The energy spectrum is also acquired during the burst, capture, and background gates. The energy spectrum from the background gate can be used to correct both the burst and capture energy spectra. To separate inelastic and capture gamma rays during the burst, the capture spectrum is accumulated at each interval during the log and used as an elemental standard. The advantage of this method is that variations in the amount of capture in the burst, due to changes in the borehole and formation, can more accurately be accounted for. Formation sigma can be computed from the gamma ray time-decay spectrum. In addition to being used as an asset to petrophysical interpretation, formation sigma can be used for depth control and for correlation between open and cased-hole logs.

Figure 4:
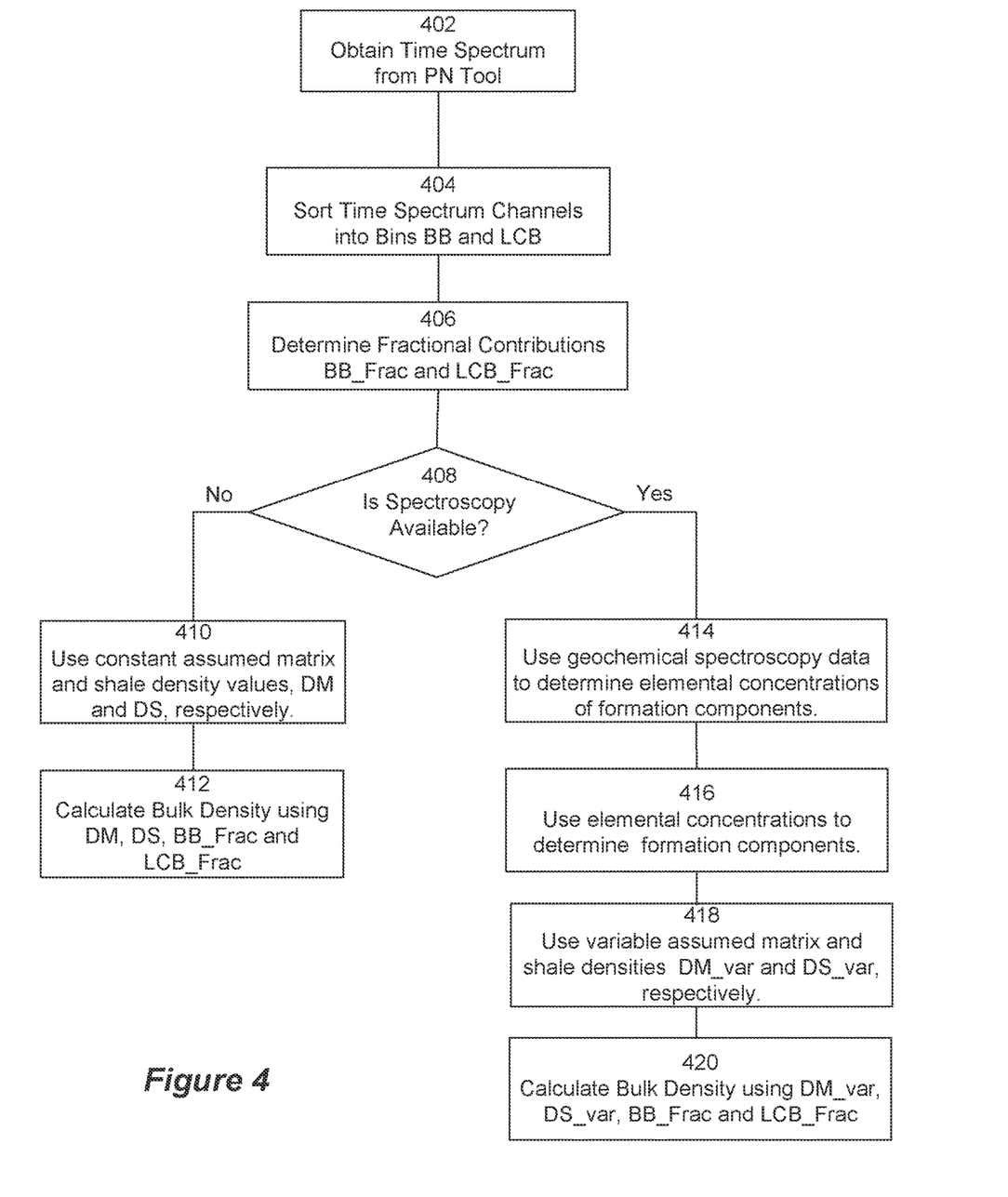
FIG. 4 shows a workflow for determining bulk density.
Figure 5:
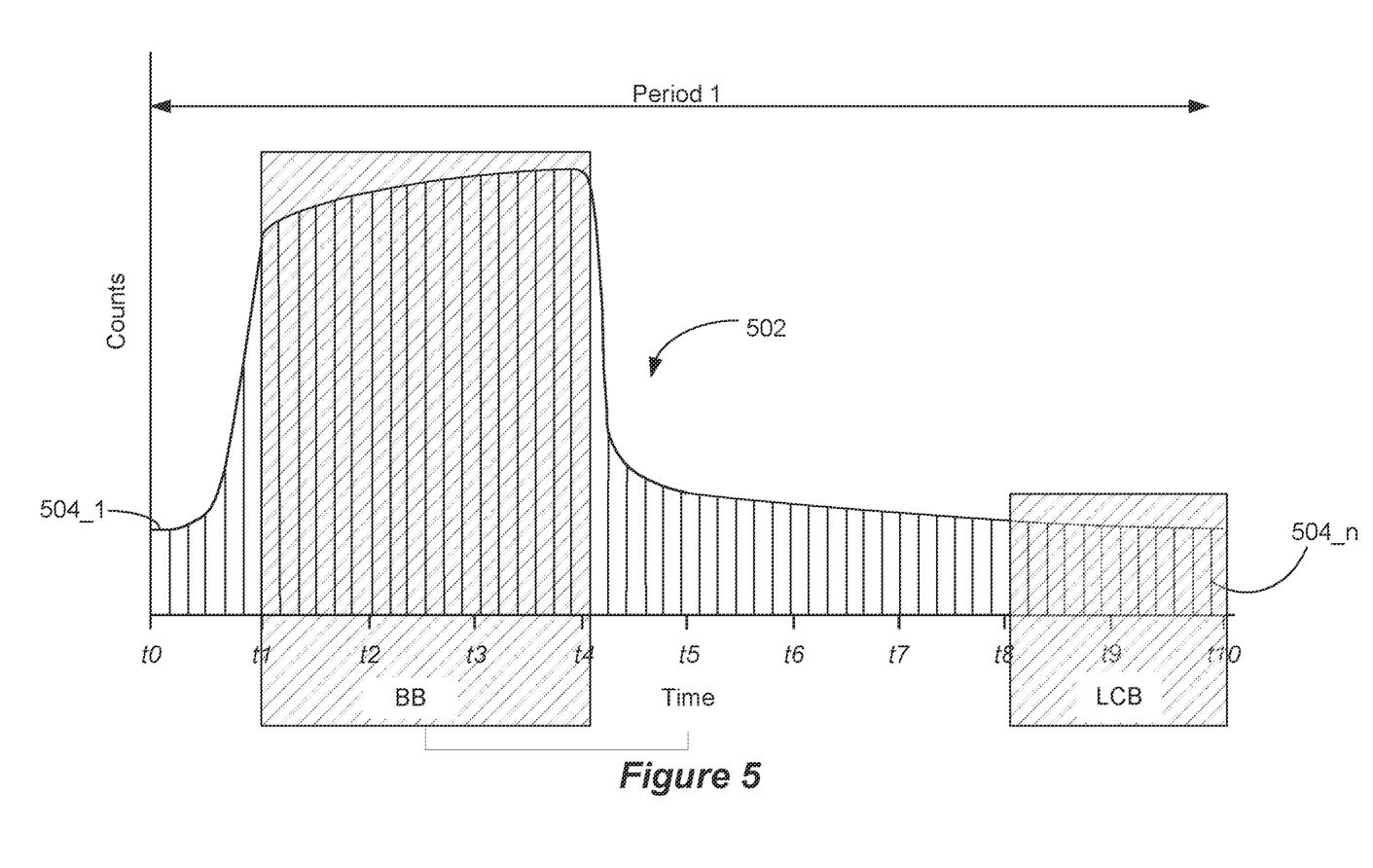
FIG. 5 shows an embodiment of binning a pulsed neutron time spectrum.

FIG. 4 illustrates an embodiment of a workflow 400 for determining bulk density using data from a PN tool as disclosed herein. Embodiments of the disclosed methods for determining bulk density involve obtaining a time spectrum of gamma counts from the PN tool (step 402). The time spectrum may be recorded in time channels (not to be confused with the energy channels discussed above). FIG. 5 illustrates a time spectrum 502 similar to the time spectrum shown in FIG. 3B. The portion of the time spectrum 502 illustrated in FIG. 5 occurs during Period 1, i.e., the time during which the neutron burst occurs and decay begins. The illustrated portion of the time spectrum 502 comprises time channels (or bins) 504_1 to 504_n. As explained above, the gamma photons detected during Period 1 arise primarily from inelastic scattering and neutron capture events.

Referring back to FIG. 4, step 402 involves sorting the time channels of the time spectrum into particular pluralities of bins that are useful for determining bulk density. Referring to FIG. 5, one plurality of time bin is denoted BB, for "burst bins." The BB bins correspond to gamma photons arising primarily to inelastic and capture events that occur during the burst of the neutron generator. Another plurality of time bins is denoted LCB, for "late capture bins," which comprises gamma photon counts arising primarily from capture events. LCB is referred to herein as "late capture bins," since they correspond to capture counts arising late in Period 1.

Step 406 involves determining the fractional contribution of the BB counts to the total number of counts in Period 1 (denoted herein BB_Frac) and the fractional contribution of the LCB counts to the total number of counts in Period 1 (denoted herein as LCB_Frac). In the disclosed bulk density methods, it is assumed that BB_Frac, the factional contribution of inelastic photons to the overall number of photons detected, is primarily indicative of non-clay mineral elements in the formation (i.e., rock). Likewise, LCB_Frac is primarily indicative of shale/clay in the formation. Without being bound by theory, this is because gamma transport is dominant within inelastic part of the time spectrum and epithermal and thermal neutron transport is dominant within the capture portion of the time spectrum. Gamma transport-mediated interactions with the non-clay formation minerals during the inelastic portion of the measurement is benefited by removal of the capture counts. However, clay minerals in contrast to non-clay minerals, contain significant amount of Hydrogen within its structure (Hydrogen Index>0). For this reason, clays have more signature within the capture portion of the time spectrum than in the inelastic portion of the time spectrum.

As described further below, steps of the workflow 400 involve using nominal densities of dominant components of the formation. The illustrated workflow comprises two scenarios. The first scenario is when the dominant components of the formation are known, for example, from open hole logging, logging-while-drilling (LWD), mud logs, or the like. For example, one might know from previous open hole logging that the dominant formation components at a particular depth are sandstone and feldspathic shale. This scenario of using previously determined formation components is referred to herein as "historical measurements of the formation" to provide the dominant components of the formation.

The second scenario is when the lithography is spectroscopically determined at the same time as the bulk density measurements are performed. For example, if the PN tool being used to determine the bulk density in the described workflow is itself a geochemical logging tool, then the tool may be used to simultaneously collect spectroscopic data that may be used to determine the formation chemistry and matrix minerology using the techniques described in the above-incorporated references (or other known techniques).

Accordingly, step 408 of the workflow involves determining whether to use previously determined knowledge of the dominant matrix and clay/shale components of the formation (the left branch of the workflow, i.e., steps 410-412) or whether to use spectroscopy to elucidate the formation components at each depth (the right branch of the workflow, i.e., steps 414-420).

We will discuss the left branch of the workflow first. At step 410, assume that spectroscopically determined minerology is not available. In that case, the workflow involves using constant assumed densities for the dominant components within the formation. For example, a density of 2.65 g/cc may be assumed for sandstone and 2.45 g/cc may be assumed for shale. A person of skill in the art will understand how to estimate assumed densities for various formation components, such as the various rocks, shales, etc., that may be present in a given formation. The density of the matrix is referred to herein as DM and the density of shale is denoted herein as DS. At step 412, the bulk density is calculated using the constant assumed densities, and the determined values for BB_Frac and LCB_Frac. According to some embodiments, the bulk density may be calculated using equation 1 (Eq. 1):

$$RHOB = DM \times \ln(\text{BB\_Frac}) - DS \times \ln(\text{LCB\_Frac}) \quad \text{(Eq. 1)}$$

Now we discuss the right side of the workflow. At step 414, assume that it was decided at step 408 to use spectroscopy to determine the formation composition. In that case geochemical spectroscopy data obtained from the PN tool is used to determine the elemental composition of the formation at the depth being logged. Techniques for determining the elemental concentrations using a PN tool as described herein are known in the art and well described. For example, according to some embodiments, the techniques described in the above incorporated '328 patent may be used to determine the elemental concentrations. Briefly, the '328 patent describes methods wherein the capture energy spectrum and the inelastic energy spectrum are each collected, deconvolved based on elemental standards, normalized, and transformed to provide yields for the capture and inelastic elements, respectively. The inelastic elemental concentrations may be determined based on calibration functions derived for each inelastic element based on numerous measurements in formations containing varying amounts of the element. Thus, calibration curves must be provided for each of the inelastic elements by performing measurements on a plurality of different formations having varying concentrations of the inelastic elements. An oxide closure model may be used to determine the elemental concentrations of all of the detected elements in the formation. At step 416 the elemental concentrations may, in turn, be used to determine the dominant matrix and clay/shale components present at the depth being logged.

At step 418 it is determined to use variable matrix and shale densities DM_var and DS_var, respectively, corresponding to the depth-varying matrix and shale components determined at step 416. At step 420 the bulk density can be calculated using the determined BB_Frac, LCB_Frac, DM_var, and DS_var values. According to some embodiments, the bulk density RHOB can be calculated according to the equation (Eq. 2):

$$RHOB = \text{DMvar\_} \times \ln(\text{BB\_Frac}) - \text{DS\_var} \times \ln(\text{LCB\_Frac}) \quad \text{(Eq. 2)}$$

Figure 6:
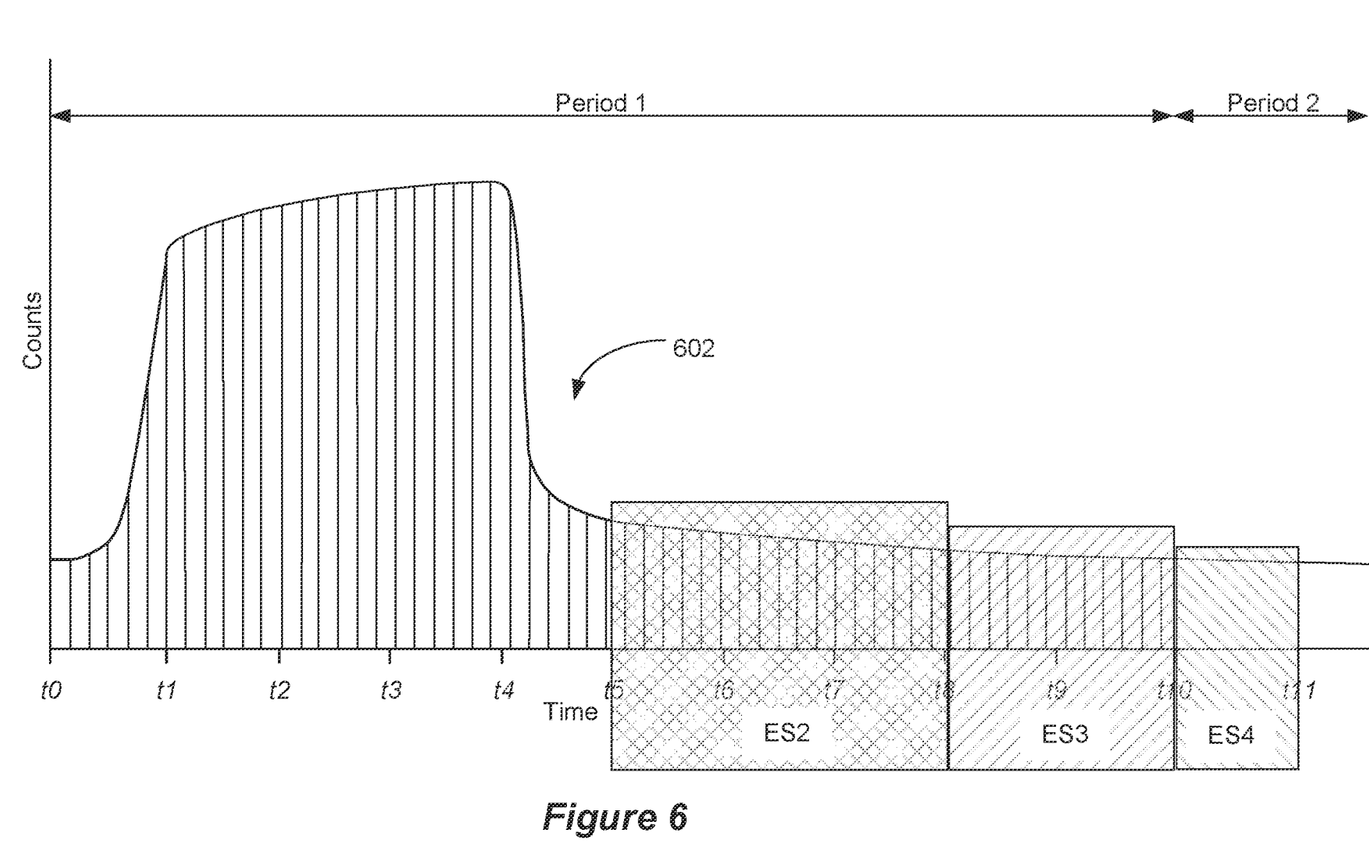
FIG. 6 shows a further embodiment of binning a pulsed neutron time spectrum.

Other embodiments of the disclosure relate to using a single detector of a PN tool, as described herein, to determine the neutron porosity of a formation. The neutron porosity can be determined from the time spectrum. To determine the neutron porosity, the time spectrum may be divided into bins, similar to the ones used above to determine bulk density. FIG. 6 illustrates a time spectrum that is binned for determining neutron porosity. The bins for determining neutron porosity are somewhat different than the ones described above. Specifically, the bulk density method described above relied on gamma counts arising from both inelastic and capture events, whereas the neutron porosity determination relies mostly on capture decay time. The bins illustrated FIG. 6 include ECB ("early capture bins"), LCB ("late capture bins," as above), and VLCB ("very late capture bins"). Note that the very late capture bin may extend into the part of the time spectrum where sigma decay is present (i.e., Period 2).

According to some embodiments, a neutron porosity ratio (NPR) may be calculated according to the formula (Eq. 3), where the values ECB, LCB, and VLCB are the number of counts detected during each of those respective pluralities of time bins:

$$NPR = LCB/(ECB + LCB + VLCB) \quad \text{(Eq. 3)}$$

According to some embodiments, each of the pluralities of bins ECB, LCB, and VLCB may be further divided into sub-bins of channels. For example, ECB may be divided into three sub-bins. According to some embodiments, the sub-bins, or combinations of sub-bins may be used in place of the respective bins in Eq. 3. The overarching purpose of the equation Eq. 3 is to focus on late capture contributions to the gamma capture counts, which are due to thermal neutrons A person of skill in the art can determine how to make the appropriate bins based on familiarity with their particular tool.

The NPR may be used to determine neutron porosity by using a linear transform based on minimum and maximum values of derived NPR versus standard expected neutron porosity values for the matrix being examined. For example, a typical neutron porosity scale for sandstone is from 60 p.u. to 0 p.u., which can be used as endpoints for the linear transform.

A person of skill in the art will appreciate that the methods described herein for determining bulk density and/or neutron porosity may be repeated at various depths within the borehole to generate bulk density and/or neutron porosity logs for the wellbore.

Some portions of the detailed description were presented in terms of processes, methods, programs and workflows. A process or workflow is here, and generally, conceived to be a self-consistent sequence of steps (instructions) contained in memory and run using processing resources to achieve a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "receiving," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

The present disclosure also relates to an apparatus for performing the operations herein. This apparatus may be specially constructed for the required purposes, or it may comprise a general-purpose computer, selectively activated or reconfigured by a computer program stored in the computer. Such a computer program may be stored in a non-transitory computer readable storage medium, which could be, but is not limited to, any type of disk including floppy disks, optical disks, CD-ROMs, a magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor, or may be architectures employing multiple processor designs for increased computing capability.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A method of determining a bulk density of a formation traversed by a borehole using a pulsed neutron (PN) tool deployable in the wellbore, wherein the formation comprises matrix materials and shale materials, and wherein the PN tool comprises a source configured to issue bursts of fast neutrons, thereby irradiating the formation with neutrons, and at least one detector configured to detect gamma photons resulting from the irradiating and arriving at the detector, the method comprising:
   (i) receiving data from at least one of the detectors, wherein the data is indicative a time spectrum of gamma photon counts detected at the single detector, wherein the time spectrum comprises a burst duration comprising photon counts detected while the source is actively issuing fast neutrons and a capture duration comprising photon counts detected while the source is not actively issuing fast neutrons,
   (ii) binning the gamma photon counts of the burst duration into a first plurality of bins and binning the gamma photon counts of the capture duration into at least a second plurality of bins and a third plurality of bins, wherein the third plurality bins comprises gamma photon counts arising later than those of the second plurality of bins, and
   (iii) using at least the first and third pluralities of bins to calculate the bulk density of the formation.

2. The method of claim 1, wherein the first plurality of bins comprises gamma photon counts arising inelastic and capture interactions in the formation.

3. The method of claim 1, wherein the second and third pluralities of bins comprises gamma photon counts arising from capture interactions in the formation.

4. The method of claim 1, wherein the data further comprises:
   a sigma decay duration comprising photon counts arising from sigma decay, and
   a background duration comprising photon counts arising from background radiation.

5. The method of claim 1, wherein using at least the first and third pluralities of bins to calculate the bulk density of the formation comprises:
   determining a first fractional contribution (BB_Frac) using the formula:
   $BB\_Frac = PC_B/(PC_B + PC_C)$, where $PC_B$ is the gamma photon counts detected during the burst duration and $PC_C$ is the gamma photon counts detected during the capture duration, and determining a second fractional contribution (LCB_Frac) using the formula:

$$LCB\_Frac = PC_C/(PC_B + PC_C).$$

6. The method of claim 5, comprising calculating the bulk density using the formula:
RHOB=DM×ln(BB_Frac)−DS×ln(LCB_Frac), where RHOB is the bulk density, DM is the density of the matrix materials and DS is the density of the shale materials.

7. The method of claim 6, wherein the matrix materials and the shale materials, and their respective densities, are determined based on historical measurements of the formation.

8. The method of claim 6, wherein the matrix materials and the shale materials are spectrographically determined using the PN tool.

9. The method of claim 1, further comprising repeating steps (i)-(iii) as a function of depth to determine a density log of the formation.

10. The method of claim 1, wherein the first plurality of bins comprises gamma photon counts arising from interactions of neutrons with non-clay materials in the formation and the third plurality of bins comprises gamma photon counts arising from interactions of neutrons with shale and/or clay materials in the formation.

11. The method of claim 1, wherein using at least the first and third pluralities of bins to calculate the bulk density of the formation comprises:
determining a fractional contribution of the gamma photon counts of the first plurality of bins to a total number of gamma photon counts in the first, second, and third plurality of bins, and
determining a fractional contribution of the gamma photon counts of the third plurality of bins to the total number of gamma photon counts in the first, second, and third plurality of bins.

12. A system for determining a bulk density of a formation traversed by a borehole using a pulsed neutron (PN) tool deployable in the wellbore, wherein the formation comprises matrix materials and shale materials, and wherein the PN tool comprises a source configured to issue bursts of fast neutrons, thereby irradiating the formation with neutrons, and at least one detector configured to detect gamma photons resulting from the irradiating and arriving at the detector, the system comprising:
a non-transitory computer readable storage medium comprising instructions, which when executed by a computer configure the computer to perform a method comprising:
(i) receiving data from at least one of the detectors, wherein the data is indicative a time spectrum of gamma photon counts detected at the single detector, wherein the time spectrum comprises a burst duration comprising photon counts detected while the source is actively issuing fast neutrons and a capture duration comprising photon counts detected while the source is not actively issuing fast neutrons,
(ii) binning the gamma photon counts of the burst duration into a first plurality of bins and binning the gamma photon counts of the capture duration into at least a second plurality of bins and a third plurality of bins, wherein the third plurality bins comprises gamma photon counts arising later than those of the second plurality of bins, and
(iii) using at least the first and third pluralities of bins to calculate the bulk density of the formation.

13. The system of claim 12, wherein the first plurality of bins comprises gamma photon counts arising inelastic and capture interactions in the formation and the second and third pluralities of bins comprises gamma photon counts arising from capture interactions in the formation.

14. The system of claim 12, wherein using at least the first and third pluralities of bins to calculate the bulk density of the formation comprises:
determining a first fractional contribution (BB_Frac) using the formula:
BB_Frac=$PC_B/(PC_B+PC_C)$, where $PC_B$ is the gamma photon counts detected during the burst duration and $PC_C$ is the gamma photon counts detected during the capture duration, and
determining a second fractional contribution (LCB_Frac) using the formula:

$$LCB\_Frac = PC_C/(PC_B + PC_C).$$

15. The system of claim 14, wherein calculating the bulk density comprises using the formula:
RHOB=DM×ln(BB_Frac)−DS×ln(LCB_Frac), where RHOB is the bulk density, DM is the density of the matrix materials and DS is the density of the shale materials.

16. The system of claim 15, wherein the matrix materials and the shale materials, and their respective densities, are determined based on historical measurements of the formation.

17. The system of claim 15, wherein the matrix materials and the shale materials are spectrographically determined using the PN tool.

18. The system of claim 12, wherein the first plurality of bins comprises gamma photon counts arising from interactions of neutrons with non-clay materials in the formation and the third plurality of bins comprises gamma photon counts arising from interactions of neutrons with shale and/or clay materials in the formation.

19. The system of claim 12, wherein using at least the first and third pluralities of bins to calculate the bulk density of the formation comprises:
determining a fractional contribution of the gamma photon counts of the first plurality of bins to a total number of gamma photon counts in the first, second, and third plurality of bins, and
determining a fractional contribution of the gamma photon counts of the third plurality of bins to the total number of gamma photon counts in the first, second, and third plurality of bins.

* * * * *